(12) United States Patent
Le Guen et al.

(10) Patent No.: US 6,238,099 B1
(45) Date of Patent: May 29, 2001

(54) EASY-TO-CLEAN OPTICAL CONNECTOR

(75) Inventors: Pierre-Yves Le Guen, Le Mans; Fabrice Lecomte, Saint-Mars D'Outiller, both of (FR)

(73) Assignee: Framatome Connectors International, Courbevoie (FR)

( * ) Notice: Subject to any disclaimer, the term of this patent is extended or adjusted under 35 U.S.C. 154(b) by 0 days.

(21) Appl. No.: 09/350,873

(22) Filed: Jul. 9, 1999

(30) Foreign Application Priority Data

Jul. 10, 1998 (FR) .................................................. 98/09081

(51) Int. Cl.$^7$ ....................................................... G02B 6/38
(52) U.S. Cl. ................................ 385/59; 385/60; 385/62; 385/72; 385/78
(58) Field of Search .......................... 385/53–69, 70–75, 385/76–87, 136–139

(56) References Cited

U.S. PATENT DOCUMENTS

| 3,922,064 | * 11/1975 | Clark et al. ........................... 385/60 |
| 4,470,660 | 9/1984 | Hillegonds et al. ............... 350/96.21 |
| 4,747,658 | 5/1988 | Borsuk et al. ....................... 350/96.2 |
| 5,054,879 | 10/1991 | Brown ..................................... 385/59 |
| 5,121,454 | * 6/1992 | Iwano et al. ........................... 385/60 |
| 5,245,683 | 9/1993 | Belenkiy et al. ....................... 385/72 |

FOREIGN PATENT DOCUMENTS 0 762 167 A1   3/1997   (EP) .

OTHER PUBLICATIONS

Patent Abstracts of Japan JP 63 151910, Jun. 1988, Nippon TZT Corp.

* cited by examiner

Primary Examiner—Hemang Sanghavi
(74) Attorney, Agent, or Firm—Perman & Green, LLP

(57) ABSTRACT

In order to simplify operations of cleaning an optical connector (1, 4), especially the female part (4) of the latter, provision is made, upon disconnection, for ferrules (5) set into the female cavities (9) of the socket to be brought flush (7) with the socket by sliding a sleeve (6) which constitutes it. It is demonstrated that, by acting in this way, it is possible to carry out more frequent and simpler cleaning operations on the optical connectors.

9 Claims, 3 Drawing Sheets

EASY-TO-CLEAN OPTICAL CONNECTOR

Figure 1:
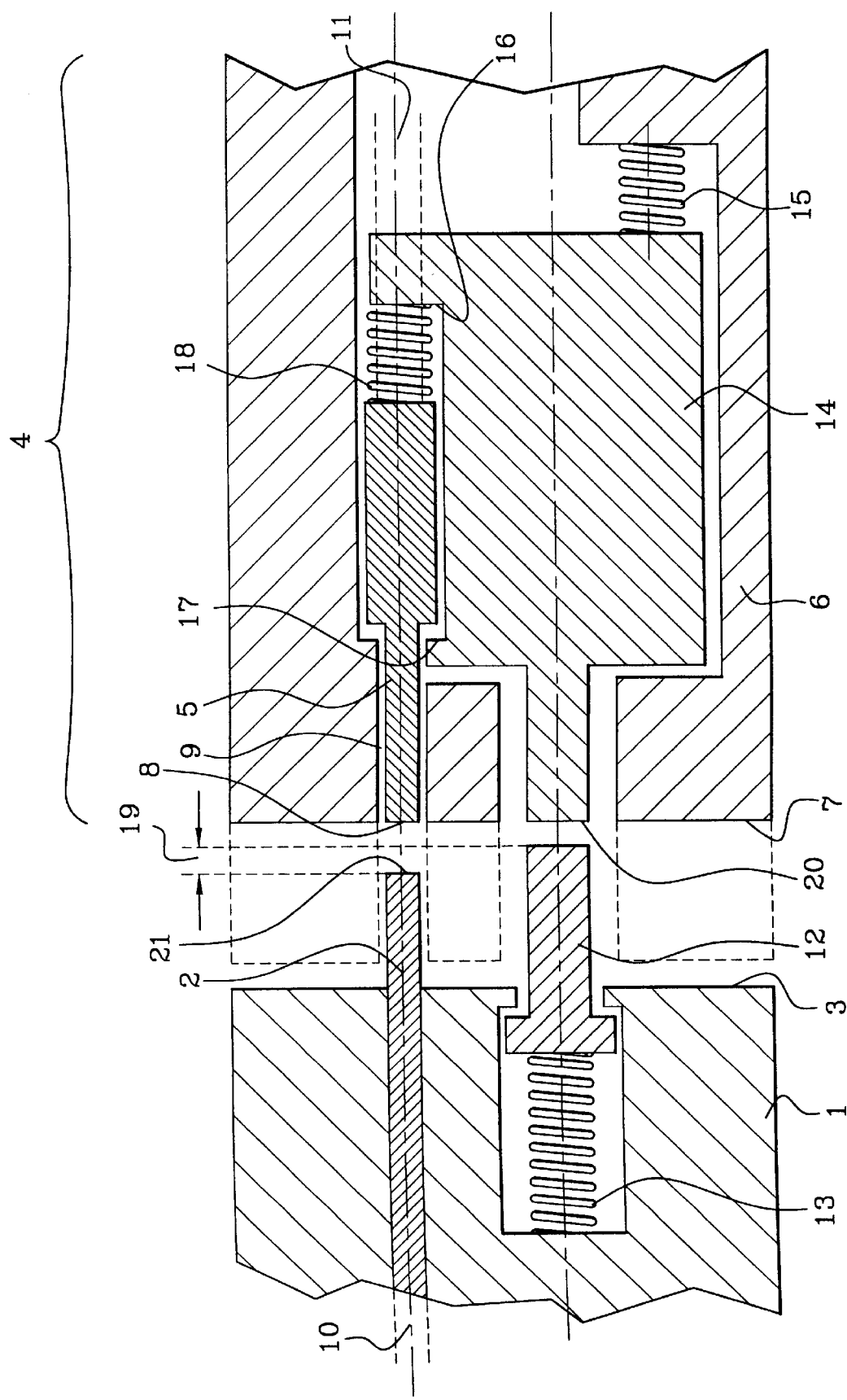

The subject of the present invention is an optical connector, that is to say a connector used for connecting lengths of optical fibre together. The object of the invention is to allow easy maintenance, especially cleaning, of this type of connector.

Fibre-optic connectors comprise, in their principle, the engagement of a male plug in a female socket. Such an engagement carries out a guiding function at the same time as a function of connecting the plug in the socket. Protruding ferrules are arranged in the male plug. Set-in ferrules are arranged, in correspondence, in the female socket. The ferrules are devices for holding and presenting one end of a length of optical fibre. The ferrules essentially provide the mechanical function of gripping a fragile end of an optical fibre. To obtain good alignment of one ferrule with respect to the other, deep insertion of the ferrules in the female socket is desired. This good alignment is obtained by means of an alignment sleeve which is around the circumference of the ferrule of the female socket and in the middle of which alignment socket the connection between the two optical ferrules is made. Despite all the precautions taken, it appears that, after a certain time in use, such an optical connector is the site of transmission losses because of dirt on the ends of the fibres held in the end of these ferrules. It is therefore necessary to clean them. Cleaning therefore becomes increasingly difficult as the depth of the contact increases.

To solve this problem, European Patent Application EP-A-0,762,167 recommends producing the female socket with a bush. The bush constitutes the female shape of the connector. When the bush is removed, the socket reveals, so as to be flush, the ends of the optical fibre in order to clean them easily. However, this solution has two drawbacks. Firstly, the intermediate bush has to be removed (and then, after cleaning, refitted). This constitutes in itself an additional operation and requires, given the miniaturization of the connectors, a special tool which has to be available. Moreover, removal of this intermediate bush may result in it being mislaid. Secondly, this bush might, upon its removal, have to be laid in a place which may not be clean, so that when it is put back into the female socket the resulting cleaning is not perfect.

The object of the invention is to remedy this problem by providing a connector in which the various components of the socket cannot be separated and in which, from the sole fact that the socket has been disconnected from the plug, it is possible to have access to the ends of the ferrules of this socket.

The principle of the invention consists in producing a female socket which can have two states. In a first, disconnected state, the ferrules of the socket appear flush with the socket. They are therefore easily accessible in order to clean them. It will furthermore be shown that, by acting in this way, dirt which would counteract the cleaning efforts cannot get into the internal members of the socket. In a second, connected state, the socket then adopts a conventional female form, corresponding to a mode of protection against external agents by the male plug fitting into this female socket.

The subject of the invention is therefore an optical connector comprising, on one side, a male plug carrying a first set of ferrules and, on the other side, a female socket carrying, in correspondence, a second set of ferrules, characterized in that the female socket includes a sliding sleeve capable of occupying two positions, namely a disconnection position in which the sleeve is set back on the socket and reveals the ends of the second ferrules and a connection position in which the sleeve is moved forward over the socket and forms the female receptacle of the connector.

Figure 2:
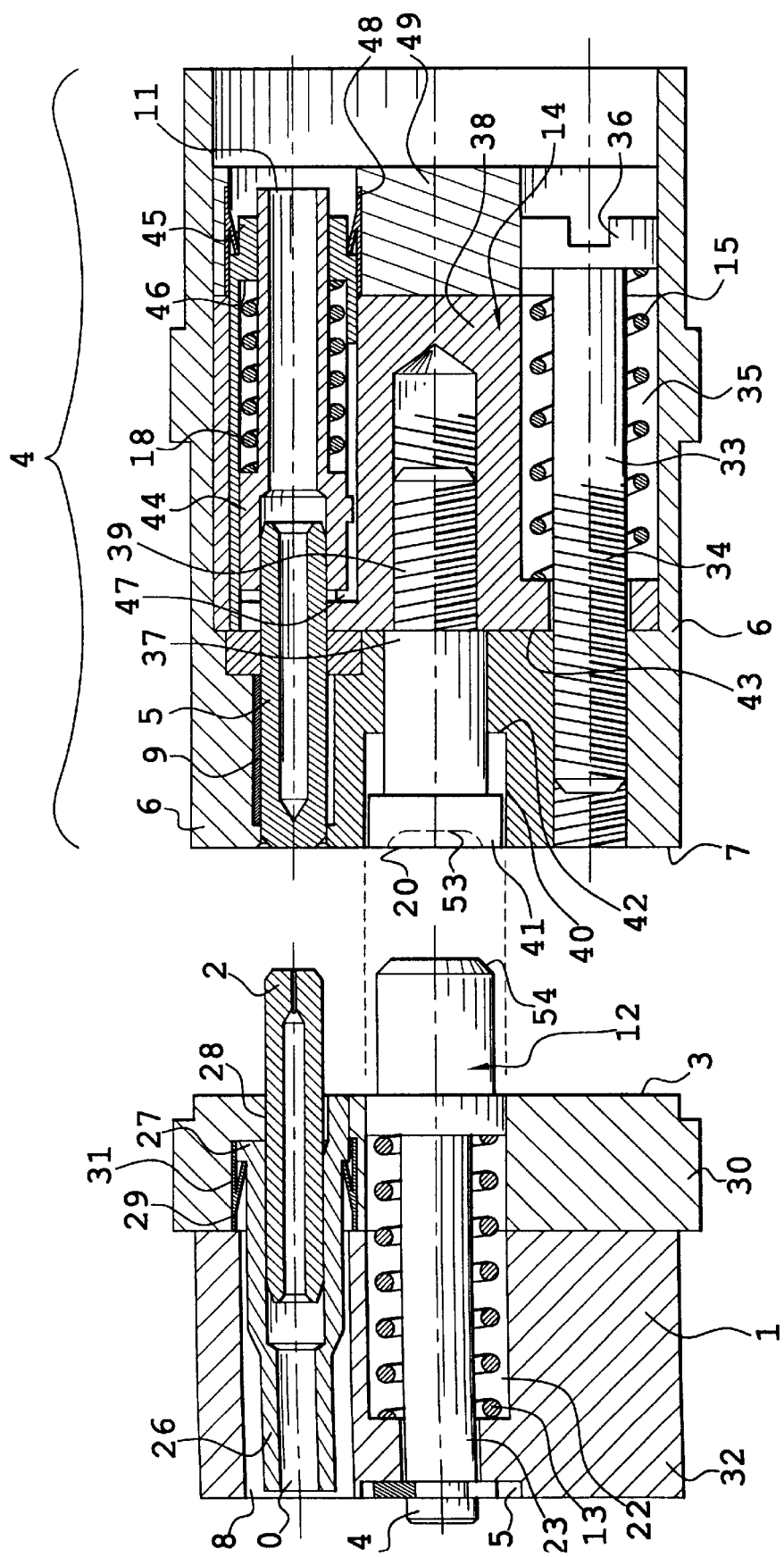

The invention will be more clearly understood on reading the description which follows and on examining the figures which accompany it. The figures are given merely by way of indication and in no way entail any limitation of the invention. The figures show:

FIG. 1: a very simplified schematic illustration of the optical connector of the invention and of its mode of operation;

FIG. 2: a detailed illustration of a preferred embodiment of the optical connector of the invention;

FIGS. 3a to 4c: illustrations, in cross section, of the connector in FIG. 2.

FIG. 1 shows, in a simplified schematic manner, an optical connector according to the invention. This connector comprises, on one side, a male plug 1. This plug 1 has a first set of ferrules 2. Only a single ferrule 2 has been illustrated because the connector could have only one of them. Nevertheless, in practice it will have several ferrules, as will be seen below. The plug is called a male plug because the ferrule 2 protrudes from one face 3 of the plug. The connector of the invention comprises, on the other side, a female socket 4. The socket 4 carries, in correspondence with the ferrules 2, a second set of ferrules 5. Here also, only a single ferrule 5 has been shown in order to simplify the drawing. According to one essential characteristic of the invention, the female socket has a body 6 which forms a sleeve and is capable of occupying two positions. The body 6 is illustrated by the hatched lines. It can occupy two positions with respect to the ferrules 5. In a disconnection position, shown in FIG. 1, the sleeve is set back and reveals, flush with its surface 7, the ends 8 of the ferrules 5 of the second set of ferrules. In this function, the ends 8 can be easily cleaned, for example using a dry paper. In another position, shown by the dotted lines, namely a connection position, the sleeve 6 is moved forward over the socket, the ferrules 5 are set back and spaces 9 that they occupied in the first position form female receptacles of the socket 4. The ferrules 2 and 5 are moreover connected to optical fibres 10 and 11, respectively.

In order to achieve this result, the ferrules 5 could simply have been held in place by a spring in a forward position with respect to the sleeve 6. However, this solution would have led to the ferrules 5 being pushed back by the action on them of the ferrules 2 during connection. This solution, which may work provided that the ends of the ferrules 5 and 2 are, on the one hand, strong and, on the other hand, not abrasive, is not preferred since it would be less well suited to frequent connection and disconnection operations.

To remedy this other problem, the invention makes provision, by way of an improvement, for the connector to be produced in a more complex manner. In this improvement, the plug 1 has a protruding pusher 12. The pusher 12 is held in place so that it protrudes from the surface 3 by a first spring 13. The socket comprises, in correspondence with this pusher 12, a moveable assembly 14. The moveable assembly 14 is held in place in the body 6 of the socket 4, towards the face 7, by a second spring 15. Moreover, the moveable assembly 14 has two bearing surfaces 16 and 17. These two bearing surfaces serve to keep the ferrule 5 pushed back, between them, by a third spring 18.

The operation of this mechanism is as follows. On the one hand, the pusher 12 protrudes by an additional amount 19 as compared with the protrusions of the ferrules 2 of the plug 1 with respect to the face 3. Correspondingly, the moveable assembly 14, in the disconnected position, is also flush with the surface 7 of the socket 4. This being the case, what is important is for the end of the pusher 12, at the start of connection, to alone come into contact with a corresponding end 20 of the moveable assembly 14. Connection is achieved by moving the sleeve 6 towards the plug 1. Simply because of this, the moveable assembly 14 is then pushed back and compresses the spring 15. The retraction of the moveable assembly into the body 6 causes, by the action of the bearing surface 17, an identical retraction of the ferrule 5 and of the spring 18. Under these conditions, the ferrules 2 can engage into the cavities 9 which are gradually exposed.

At a given moment, the moveable assembly 14 can no longer retreat. It will be assumed for the moment that the spring 15 is at its limit of compression. It will be shown below how precisely, given the necessary movement precision, this abutment blockage of the moveable assembly 14 is obtained. If, after this blockage, the connection operation is continued, particularly by the sleeve 6 continuing to move towards the plug 1, the end 20 then drives the pusher 12 right in and compresses the spring 13. This being so, the end 21 of the ferrule 2 travels along the space 19, inside the cavity 9, and approaches the end 8. For this purpose, at the moment when the moveable assembly 14 is blocked, the end 8 lies approximately at mid-depth of the cavity 9. In other words, the entire insertion force has firstly been produced due to the effect of the spring 15, and then due to the effect of the spring 13 until the end 21 comes into contact with the end 8.

The end 21 of the ferrule 2 is fixed with respect to the face 3 of the plug 1. It therefore cannot retreat. Under these conditions, if the connection operation is continued further, the ferrule 5 retreats into the moveable assembly 14, comprising the spring 18. In practice, arrangements are made so that the latter movement, in which the ferrule 5 is actually in mechanical reaction against the ferrule 2, is as limited as possible, for example limited to 0.5 mm. On account of engagement already largely accomplished, there is little to fear from dirt resulting from this end of the connection operation. Moreover, it is found that. when cleaning the ends 8, the cavities 9 cannot be contaminated—they are protected by the presence of the ferrules 5.

During connection, the sleeve 6 is held against the plug 1 by means consisting, inside a casing (not shown), of retractable catches in order to hold these two components in this position. During disconnection, these catches are released. The spring 18 and the spring 15 then work together, over a small travel, in order to push back the sleeve 6. Thereafter, for the rest of the travel, essentially the spring 13 and then the spring 15 act to separate the socket 4 from the plug 1. Towards the end of the disconnection, the spring 15 has the effect of pushing the moveable assembly 14 carrying the ferrules 5 back towards the surface 7 of the socket in order to allow them to be cleaned. Under these conditions, simply because of the fact that the plug has been disconnected from the socket, the ends 8 of the ferrules 5 become visible in order to be cleaned.

FIG. 2 shows a preferred embodiment in detail, rather than the simple representation in FIG. 1. For the corresponding parts, FIG. 2 uses the same reference numbers as those in FIG. 1. The plug 1 has, in order to hold the pusher 12 in place, a bore 22 which emerges at the rear of the plug 1 in a narrower bore 23 which houses a rod 24 fastened to the pusher 12. The rod 24 is provided in its rear part with a pin 25, wider than the bore 23, which limits the escape of pusher 12. Fitting the pusher 12 into the plug 1 is simple. The spring 13 is placed in the bore 22, followed by the pusher 12 and its rod 24 through the bore 22, the bore 23 and the spring 13. The pusher 12 is pushed in and the pin 25 is fitted. Next, by releasing the pusher 12, the latter protrudes from the face 3 by an expected amount limited by the pin 25.

The ferrule 2 is carried by a ferrule holder 26. The ferrule holder 26 has, at the front part, a ring 27. The ferrule 2 of the ferrule holder 26 is crimped onto the optical fibre 10 in the factory. The ferrule 2 and its ferrule holder 26 are fitted into the plug 1 by inserting this plug into a bore 28 made in the plug 1. The bore 28 has, at the head, a resilient catch, for example a bladed ring 29 placed in the bore 28. While the ferrule is being inserted, the ring 27 pushes back the blades of the ring 29. As soon as it has gone passed the ends of these blades, the latter escape and form an irreversible catch preventing the retraction of the ferrule 2 into the plug 1. In order for the ring 29 to be able to be inserted and to be held in place at the head of the plug 1, the plug 1 includes a plate 30 having, at the point where the ring is located, a bore 31 which is larger in diameter than the bore 28 in order to house this ring 29. The plate 30 is then fixed to a body 32 of the plug 1 by any means. In particular, it is screwed on.

In order for the moveable assembly 14 to be moved longitudinally in the body 6 of the plug 4, the body 6 is provided with one or more guide screws or bolts. The bolt 33 is, for example, screwed from the front race 7 of the socket 4 into the sleeve 6 of the socket. The bolt 33 then penetrates into a bore 34 made in the moveable assembly 14. By thus providing several bolts 33 and several bores 34, it is guaranteed that the moveable assembly 14 moves properly, longitudinally in the connection direction, as required. The spring 15 is placed around the bolt 33 in a combined bore 35, i.e. a bore belonging partly to the moveable assembly 14 and partly to the body 6 of the socket 4. The spring 15 is held in place in abutment by a heel 36 fixed to the body 6, or by the head of the screw in the case of the use of a guide screw.

The moveable assembly 14 is made in two parts. It has an anvil 37 fixed to a base 38 by a screw 39. The body 6 has a bore 40 for housing a head 41 of the anvil 37. The head 41 has the shape of a ring. The bore 40 has a stop 42 in order to limit the movement of the head 41. The base 38 moreover has a bearing surface 43 in order to bear on the body 6 on either side of the bore 40.

These various components are then fitted as follows. The base 38 is moved towards the sleeve 6. The anvil 37 is inserted into the bore 40. The head 41 and the anvil 37 axe fixed to the base 38 with the screw 39. The movement of these components is then limited by the reaction of the base 38 on the face 43 of the sleeve 6 and by the reaction of the head 40 in the stop 42. The spring 15 and the heel 36 are then put into place.

The ferrule 5, like the ferrule 2, will have a ferrule holder 44. The ferrule holder 44 is mounted, in preparation, in a tube 45 with the spring 18. For this purpose, the tube 45 has two bearing points, namely a bearing rabbet 46 for the spring 18 and a stop 47 for holding the ferrule holder in place. The stop 47 serves both as a bearing point for retaining the ferrule holder in the tube 45 and as a bearing surface for the tube 45 in a bore made for this purpose in the body 6 in order to house this unit.

This fitting is carried out in the following manner. The ferrule 5, the ferrule holder 44 and the optical fibre 11 are fitted, in the factory, with the spring 18 inside the tube 45. The tube 45 is then inserted, via its end, into the bore 9. The stop 47 limits its movement on one side. A second bladed ring 48, of the same type as the ring 29, allows the position of the tube 45 to be locked against the stop 47. In the same way as the plug 1 was made with a plate 30 and a plug body 32, the moveable assembly 14 has the actual base 38 and a bottom 49 for housing the ring 48.

Figure 3C:
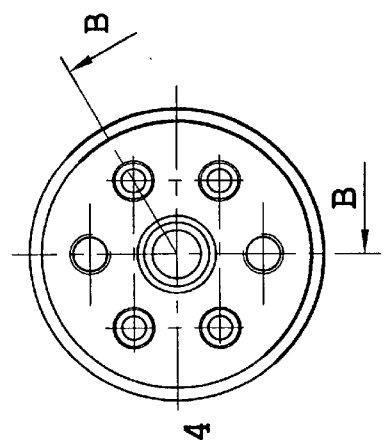
Figure 3B:
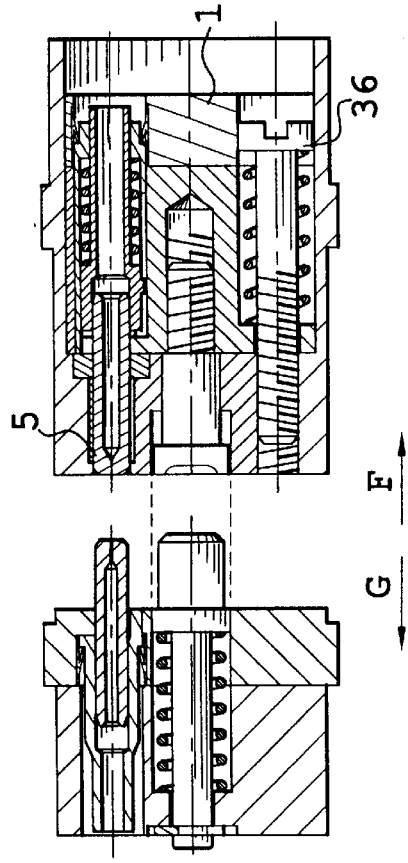
Figure 3A:
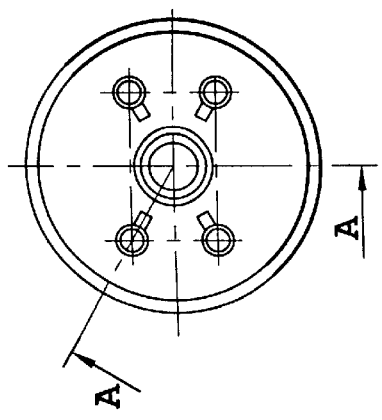
Figure 4C:
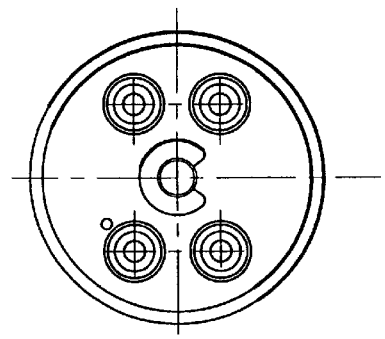
Figure 4B:
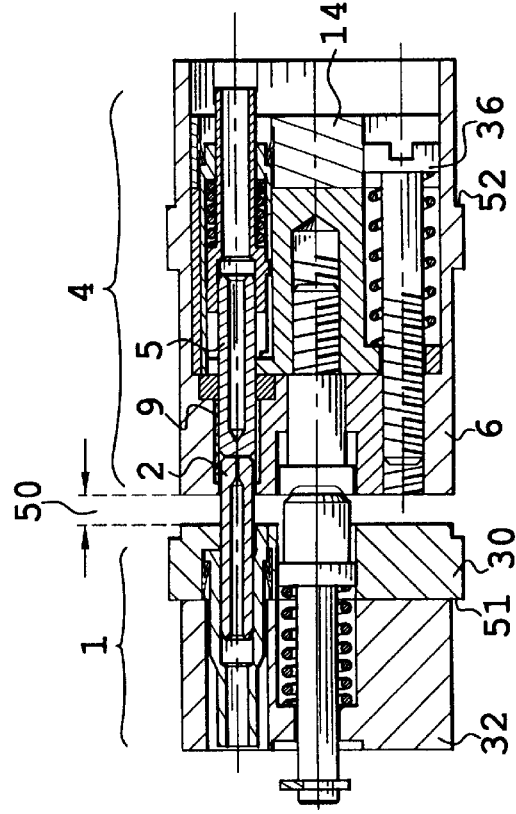
Figure 4A:
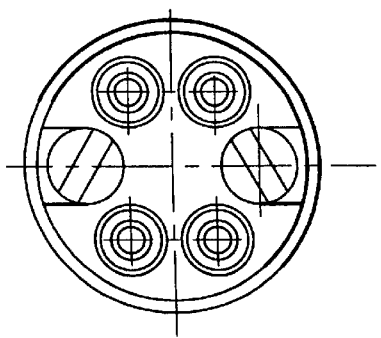

FIGS. 3a to 4c again show the same elements. FIGS. 3b and 4b are cross sections on the directions A—A and B—B of FIGS. 3a and 4a and 3c and 4c, respectively. The latter are views in the directions G and F of FIGS. 3b and 4b, respectively. In FIG. 3b, the connector is disconnected. In FIG. 4b, it is connected. FIG. 4b shows the travel difference 50, for which the ends of the ferrules 2 and 5 are in mechanical contact. FIGS. 3b and 4b show, on the one hand, a forward position and, on the other hand, a set-back position of the moveable assembly 14 and of the ferrules 5. The plate 30 has, with respect to the body 32 of the plug 1, a step 51. The sleeve 6 likewise has a rabbet 52. The step 51 and the rabbet 52 serve to keep the plug 1 and the socket 4 locked in the connection position in a casing (not shown). FIG. 4b shows the contacting of the ferrules 2 and 5 approximately halfway along the bore 9.

For centring, during insertion, provision may be made for the head 41 of the anvil 37 to be provided with a recess 53 intended to house a chamfered end 54 of a cylindrical pusher 12. This may allow better guiding during insertion and prevents the ferrule 2, which fits into the cavity 9, from acting as a guide. If required, the ferrule 2 will be strengthened for this purpose.

What is claimed is:

1. Optical connector comprising, a male plug (1) carrying a first set of ferrules (2) and a female socket (4) carrying, in correspondence to the first set of ferrules, a second set of ferrules (5), characterized in that the female socket includes a sliding sleeve (6) capable of occupying two positions, namely a disconnection position in which the sleeve is set back on the socket and reveals (7) the ends (8) of the second set of ferrules and a connection position in which the sleeve is moved forward over the socket and forms a female receptacle (9) of the connector, wherein, the plug has a pusher (12) held in place by a first spring (13) so that it protrudes with respect to the plug, and wherein the socket has, in correspondence with the pusher, a movable assembly (14) held in the socket in a forward position by a second spring (15).

2. Connector according to claim 1, characterized in that the movable assembly has two bearing surfaces (16, 17) and a third spring (18) resting on one of these bearing surfaces in order to push the second set of ferrules back towards the other bearing surface.

3. Connector according to claim 2, characterized in that the travel (50) of the third spring is smaller (19) than the travel of the first spring.

4. Connector according to claims 1, characterized in that the movable assembly has a bore (34) for guidingly housing a bolt (33) fastened to the sleeve.

5. Connector according to claim 1, characterized in that at least one of the movable assembly and the plug has a bore (28) provided with a resilient catch (29, 48) for housing a ferrule bearing against it.

6. Connector according to claim 1, characterized in that
the pusher is cylinder,
the movable assembly has a ring (41) and
the sleeve has a circular bearing surface (42) for stopping the ring from moving forwards.

7. Connector according to claim 1, characterized in that the pusher has a chamfered end (54) for engaging in a recess (53) in the movable assembly.

8. Connector according to claim 1, characterized in that the second set of ferrules are inserted by reaction (46, 47) on a third spring (18) in a tube (45) provided with two end bearing surfaces.

9. Connector according to claim 1, characterized in that the plug and the socket have reliefs (51, 52) in order for them to be held in place connected in a casing.

* * * * *